United States Patent [19]

Udelle

[11] Patent Number: 5,680,831

[45] Date of Patent: *Oct. 28, 1997

[54] COMBINED MECHANICALLY ASSISTED ANIMAL EXERCISE, AMUSEMENT, SELF GROOMING, AND CLAW SCRATCHING STIMULATOR

[76] Inventor: Steven D. Udelle, 26414 Barranquilla Ave., Punta Gorda, Fla. 33983

[*] Notice: The term of this patent shall not extend beyond the expiration date of Pat. No. 5,517,945.

[21] Appl. No.: 603,742

[22] Filed: Feb. 20, 1996

[51] Int. Cl.[6] .................................................. A01K 13/00
[52] U.S. Cl. ................................... 119/609; 119/706
[58] Field of Search .............................. 119/707, 711, 119/706, 702, 609, 627, 663, 664; 446/131, 136, 168, 170

[56] References Cited

U.S. PATENT DOCUMENTS

| | | | |
|---|---|---|---|
| 2,441,058 | 5/1948 | Carwile | 119/663 |
| 2,721,538 | 10/1955 | Latham | 119/609 |
| 3,175,537 | 3/1965 | Paul | 119/664 |
| 4,722,299 | 2/1988 | Mohr | 119/707 |
| 4,996,946 | 3/1991 | Olson | 119/706 |
| 5,009,193 | 4/1991 | Gordon | 119/707 |
| 5,176,105 | 1/1993 | Madden | 119/707 |

*Primary Examiner*—Todd E. Manahan

[57] ABSTRACT

A device that provides a combination of uses for animals comprising a grooming brush body (51) having bristles (53) affixed thereto. An upper surface (49) contains a claw scratching surface (57) that is affixed to surface (21). Track ring assembly (11) includes a lower surface (17), an inside peripheral sidewall (13) and an angled outside peripheral sidewall (19) which houses a freely movable ball (25) therein. Motor assembly (29) rotates a mushroom-shaped brush body (51) that simultaneously grooms the top and side of an animal's coat. The animal simply presses its body against the rotating brush for effective self-grooming.

11 Claims, 3 Drawing Sheets

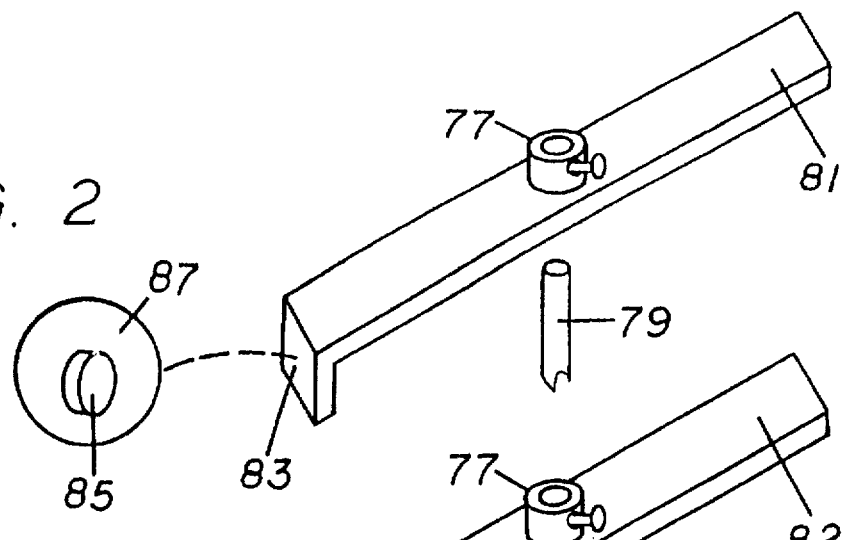
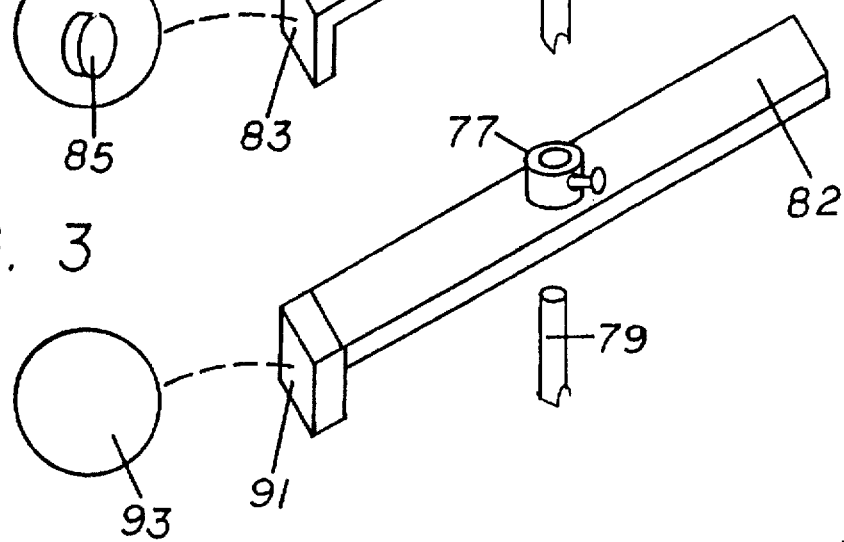
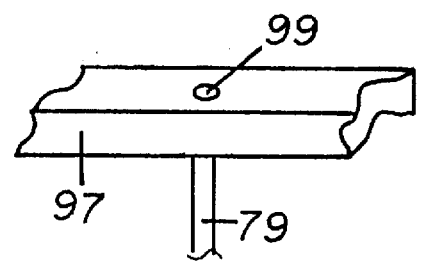

5,680,831

1

COMBINED MECHANICALLY ASSISTED ANIMAL EXERCISE, AMUSEMENT, SELF GROOMING, AND CLAW SCRATCHING STIMULATOR

FIELD OF THE INVENTION

The present invention relates to animal amusement and self grooming devices, but more particularly to a combination mechanically assisted exercise, amusement, claw scratching, and self grooming device that mechanically rotates a grooming brush and orbits a ball shaped lure simultaneously.

BACKGROUND—DISCUSSION OF THE PRIOR ART

Animal amusement devices have a movable object on, around, or within these devices. An animal is usually shown by demonstration the movable or rolling object in the device, whereby the animal's inherent instinct to attack, or play with a moving object is imminent however, these objects have to be initially moved by an animal or human hand to begin with, and unfortunately a good device becomes unused for long periods of time, and just occupies space. Stationary self grooming devices do not provide an incentive, or attraction to be used by an animal more frequently, as the animal has to provide all of the motions or efforts to utilize the devices as they were intended. Most animals will remain very appreciative for extended periods of time, when brushes are moved against their bodies by the human hand. Examples of devices more closely associated to the present invention's amusement and exercise concept are U.S. Pat. No. 4,722,299, by Mohr, Feb. 2, 1988, U.S. Pat. No. 5,269,261, by McCance, Dec. 14, 1993, both showing a device comprising a ball within a closed loop requiring an animal or human hand to initiate movement of the ball. Examples of devices more closely associated to the present invention's self grooming concept are U.S. Pat. No. 5,207,183, by Praschulk, May 4, 1993, U.S. Pat. No. 5,211,131, by Plyler, May 18, 1993, and U.S. Pat. No. 4,729,147, by Armbruster, Mar. 8, 1988, showing mechanical animal grooming devices that require the use of a human hand. The prior art does not teach on the use of a motivational means that would exhibit an irresistable incentive or attraction to an animal, whereby the animal would benefit from increased use of the device more often. The present invention takes advantage of the inherent instincts of an animal's response to a moving object, when the original movement of the object is not physically initiated by the animal, or human hand, but by the device. The prior art does not teach of combining an exercise, amusement, claw scratching, loose hair retention, and grooming device in one assembly, thereby eliminating the need to purchase one of each.

SUMMARY OF THE INVENTION

The present invention utilizes the phenomena of invisible or unseen forces of magnetic fields. In the space around every permanent or electromagnet, there exists a force field. A magnetic field is an example of the physical phenomenon known as a force field, inherent in every electric charge, and in the gravitational field around every mass, electromagnet, and permanent magnet. The present invention employs an electro-mechanical and magnetic apparatus. Generally, the present invention is comprised of a circular housing, having a top or carpeted platform surface, a mounting surface for a motor, and a vertical orientated side surface, which also serves as a base. The housing further includes a U-shaped lure ring surrounding the outside perimeter of the vertical orientated side surface. A motorized mechanism is concealed below the carpeted platform surface, comprised of a motor, motor output shaft, a sweep arm containing at least one permanent magnet at one end, possessing an inherent magnetic force field mounted at a right angle to the geared motor output shaft, further including the output shaft, extending sufficiently upward and exposed through the carpeted platform surface to accommodate a rubbing means or elongated brush mounted directly inline to the motor output shaft. The output shaft rotates one revolution clockwise and one revolution counterclockwise continuously. A motor reversing switch is activated by a cam affixed to the lowermost portion of the shaft output sweep arm, and the shaft output speed is preselected by a rheostat. The permanent magnet affixed at either end of the sweep arm causes a ball shaped lure containing a loose permanent magnet within its shell, to orbit back and forth within the partially exposed recess or cavity of the U-shaped ring. The U-shaped ring may be a permanent feature of the device or an accessory add-on feature. The lure ring may also contain a plain round ball, wherein the movement of the ball is initiated by the animal. A portion of the exposed recess or cavity of the U-shaped lure ring is sufficiently concealed with a cover to provide a hide and seek scenario of the lure ball. Predetermined output shaft speeds of one to 100 revolutions per minute may be preselected for a particular classification of animal, by adjusting an accessible potentiometer or rheostat mounted to the device.

It is therefore an object and advantage of the present invention to provide. a combined mechanically assisted, animal amusement, entertainment, exercise, claw scratching, loose hair and animal body debris containment, and self grooming stimulator device, that does not require an animal or human hand to initiate movement of the grooming brush or ball shaped lure, thereby producing a synergistic effect.

Another object is that the rotatable brush would simulate the movement of a human hand when brushing an animal.

Another object is to combine mechanically assisted animal amusement, exercise, claw scratching, loose hair containment, arid self grooming concepts into one device, thereby eliminating the need for multiple purchases of single use devices.

Another object is to have an animal expend its surplus energy more often, thereby developing improved muscle tone, alertness, coordination, a frequently groomed coat, and better sleeping habits.

Another object is that upon activation of the device, a cat will always respond to the activity presented by the device.

Another object is that the device would relieve the animal from boredom, by providing amusement, or grooming of itchy skin, thereby saving areas of household furniture from damage, loose hair, and soiling.

Another object is that an enticement to use a device, such as catnip, would no longer be required.

Another object is that the rubbing medium and claw scratching carpeted floor serve to contain loose animal hair and debris within the device, thereby protecting the living environment from unnecessary animal hair, body dirt, and claw damage.

Another object is that the motorized grooming device can be made suitable for any preselected classification of animal, such as domesticated animals, and animals in a zoo habitat.

Other objects and advantages may be readily determined by the following descriptions.

BRIEF DESCRIPTION OF THE DRAWINGS

FIG. 2 is a perspective view of an alternate metallic sweep arm of FIGS. 1a and 1b, void of permanent magnets, and a magnet containing lure ball having a strong attraction to the metallic sweep arm.

FIG. 3 is a perspective view of another alternate sweep arm of a preselected material, containing one permanent magnet affixed at one end, having a strong attraction to a thin metallic lure ball.

FIG. 4 shows a perspective view of still another alternate sweep arm comprised of a permanent bar magnet affixed directly to a cutaway view of a motor shaft.

FIG. 5 is an exploded perspective view of an alternate embodiment of FIG. 1a.

COMPLETE DESCRIPTION OF THE INVENTION

Figure 1A:
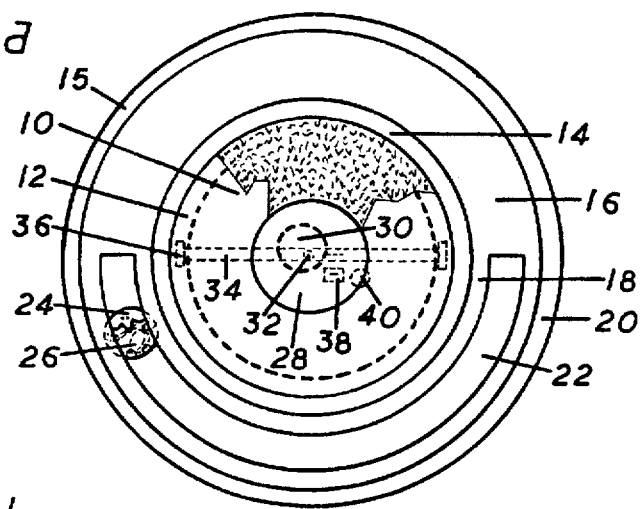
FIG. 1a is a plan top view of the present invention showing a circular enclosed housing concealing an electromechanical magnetic apparatus in hidden lines. Encircling the perimeter of the housing is a partially exposed U-shaped lure ring containing a ball.

FIG. 1a is a top plan view of the present invention showing the various components and their relative position to each other.

Figure 1B:
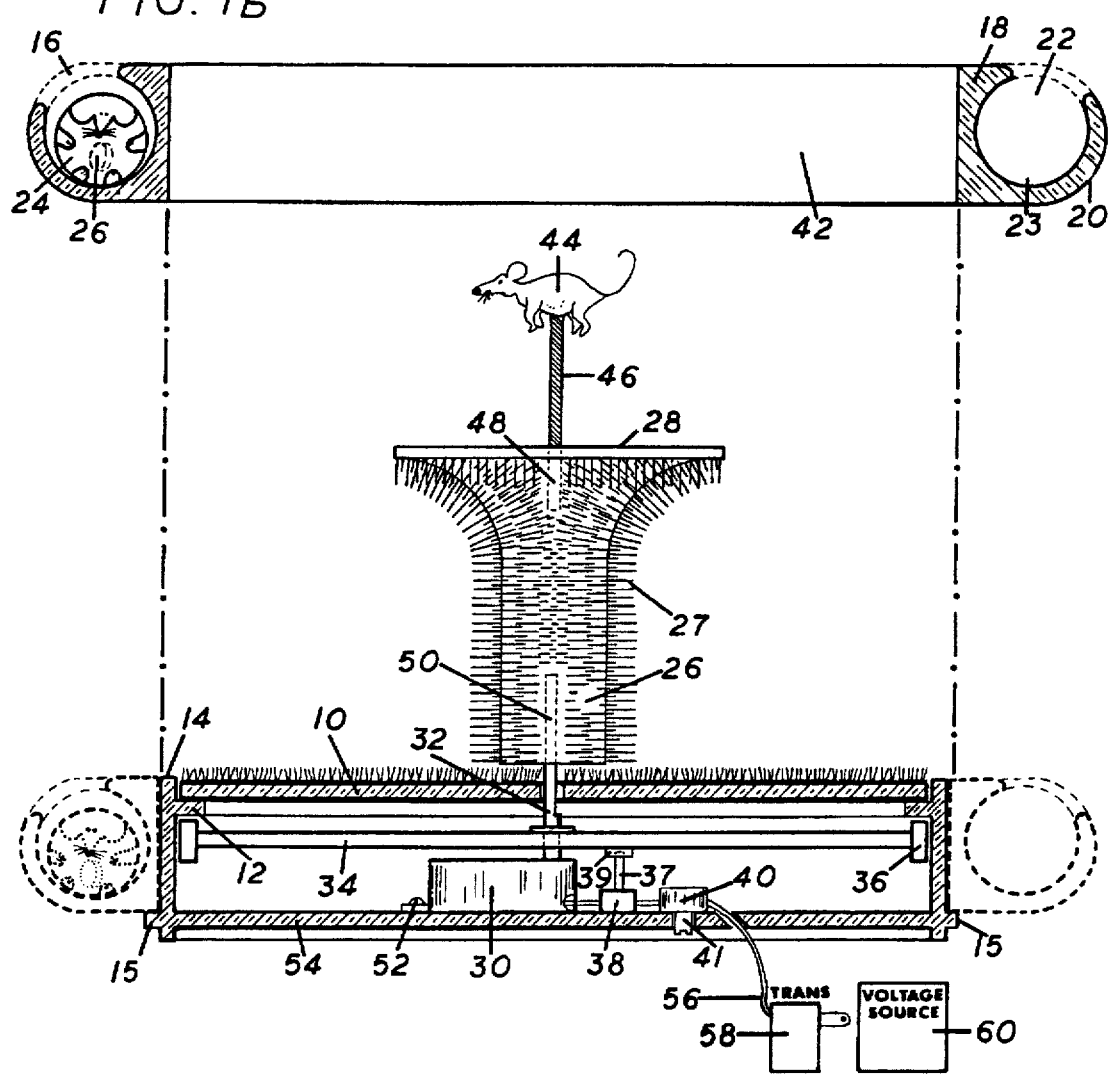
FIG. 1b is an exploded plan side view or a U-shaped lure ring and circular enclosed housing in cross section, displaying the component parts or an electromechanical magnetic apparatus and grooming brush. The U-shaped lure ring illustrated in hidden lines, shows its final position relative to the circular enclosed housing.

FIG. 1b is an exploded side plan view of the device housing and lure ring in cross section showing the various components and their relative positions to each other. FIGS. 1a and 1b show a circular housing 14 comprised of a carpeted platform surface 10 for animal claw scratching and loose hair retention, supported by a circular mounting ledge 12. The lure ring body 42 is depicted as an add-on accessary (though it may be made permanent), and rests on circular positioning ring ledge 15 which is part of housing 14. The lure ring 42 is comprised of a closed circuit U-shaped trough or cavity 23 having a partial opening 22 exposing the interior of the U-shaped trough or cavity 23. A sufficient portion of the opening 22 has a cover 16 for concealment of a ball shaped lure 24 containing a loose secondary permanent magnet 26 within its shell. The ball shaped lure 24 is confined within the U-shaped trough or cavity 23 containment walls 18 and 20, and provides a hide and seek scenario for an animal when it orbits under the concealment cover 16 portion. A motorized mechanism is concealed below the carpeted platform surface 10 and is comprised of an internally geared motor, fastened 52 to base 54, receiving electrical power from voltage source 60, via transformer/plug 58, through reduced voltage wiring 56, to an adjustable speed controlling rheostat 40, to motor reversing switch 38, and then to motor 30 producing predetermined revolutions per minute. The motor 30 is internally geared to motor output shaft 32, which in turn rotates a sweep arm 34 mounted at a right angle to output shaft 32, and rotates at a predetermined speed. The sweep arm 34 has a primary permanent magnet 36 affixed at both of its ends, and through interaction of the primary permanent magnet 36 possessing an inherent magnetic force field, and the secondary loose permanent magnet 26, within the lure ball 24 possessing a similar force field, an orbiting spin, and hop of the lure ball 24 takes place around the confines of the U-shaped ring 42. The motor output shaft 32 also extends upwards, and out through the carpeted platform surface 10, exposing a sufficient amount of shaft, having a partial flat surface, wherein it mates within the recessed opening 50, also having a flat spot shown in hidden lines for easy insertion or removal without the use of a set screw. The output shaft 32 rotates the circular rubbing medium or brush 27 at predetermined revolutions per minute. An adjustable speed controlling rheostat 40 is employed to provide a preselected RPM for the movable object, or lure ball 24, and the rubbing medium 27. The rheostat shaft 41 is accessible through the bottom of base 54, and is slotted for RPM adjustment with a screwdriver. A double pole, double throw motor reversing micro switch 38, located adjacent to the motor 30, provides one revolution clockwise, and one revolution counterclockwise of the movable object 24, and the rubbing medium 27 simultaneously. The motor reversing switch 38 is activated every revolution by a switch cam 39 permanently affixed to, and under sweep arm 34. The switch cam 39 contacts a thin flexible blade 37 of sufficient length, allowing the motor gear train to coast without passing the blade 37 before reversing rotation, thus avoiding gear shock and switch shock. An animal, such as a cat, can self groom with the grain, and against the grain of its coat every alternating revolution of the brushing medium 27, thereby insuring loose hair and body debris being removed and having its skin surface massaged. The rheostat 40 can be adjusted for the rubbing medium speed by a pet owner, more suitable to their animal. The rubbing medium 27 can be removed by lifting upwards from the output shaft 32 if simultaneous movement of the lure ball 24 and the rubbing medium 27 are not to be used for a particular reason. The exposed output shaft 32 should have a cover installed to protect an animal from injury. Obviously, different shaped rubbing mediums or brushes can be employed. The lure ball can also be removed if desired by pulling it through the restricting opening of the lure trough 22. The rheostat shaft 41 can be adjusted for higher output shaft speeds. Upon a thorough testing of applicant's prototype, output shaft speeds of one to 100 RPM revealed the following: the rubbing medium or brush rotational speeds between ten and twenty RPM seem to be the most satisfactory to cats. Movable object or lure ball orbiting speeds of one to five RPM produce a consistent spinning of the lure ball as it orbits the confines of the lure ring. Lure ball speeds of six to ten RPM produce an intermittent spin and slight hop movement. Lure ball speeds of between ten to thirty RPM seem to produce the wildest gyrations, combining various spinning rates and an extreme hopping of the lure ball which is particularly exciting to cats. The noticable hopping effect suggests making the lure ring confining recess, or cavity deeper, allowing more unrestricted height for the hopping event. Higher rotational speeds of the sweep arm with the brush removed, no longer moves the lure ball at a matching speed, but coaxes the lure ball to orbit about ten to twenty RPM by the reaction influence of the primary and secondary permanent magnet force fields and produces similar lure ball gyrations. On final analysis, the lure ball functions effectively at about the same RPM as the rubbing medium when used simultaneously. An accessory lure 44, affixed to a stiff flexible spring 46, and extending within recess 48 of brush top surface 28 provides an additional source of amusement for an animal. Combining animal amusement, exercise, grooming, and claw scratching features of good quality to one device eliminates the necessity of purchasing single purpose devices, thereby saving the consumer considerable expense.

FIG. 2 is a perspective view of an alternate metallic sweep arm 81, void of primary permanent magnets with a ninety degree bend 83 at one end, a cutaway portion of motor output shaft 79, and a shaft hub and set screw 77. The loose permanent magnet 85 within the non-metallic shell of the lure ball 87 is strongly attracted to the ninety degree bend 83 of the metallic sweep arm 81. This alternate eliminates several permanent magnets.

FIG. 3 is a perspective view of another alternate sweep arm 82 made of a preselected material with a permanent magnet 91 affixed to one end of sweep arm 82, a cutaway portion of motor shaft 79, and a shaft hub with set screw 77. The permanent magnet 91 is strongly attracted to a thin metallic lure ball 93. This alternate also eliminates several permanent magnets.

FIG. 4 is a cutaway view in perspective of a permanent bar magnet 97 and typical mounting method, whereby it is press fitted or epoxy cemented to a cutaway portion of motor shaft 79. The permanent magnet 97 is strongly attracted to the thin metallic lure ball 93 of FIG. 3. This alternate employs a permanent magnet directly to the motor output shaft.

Figure 5:
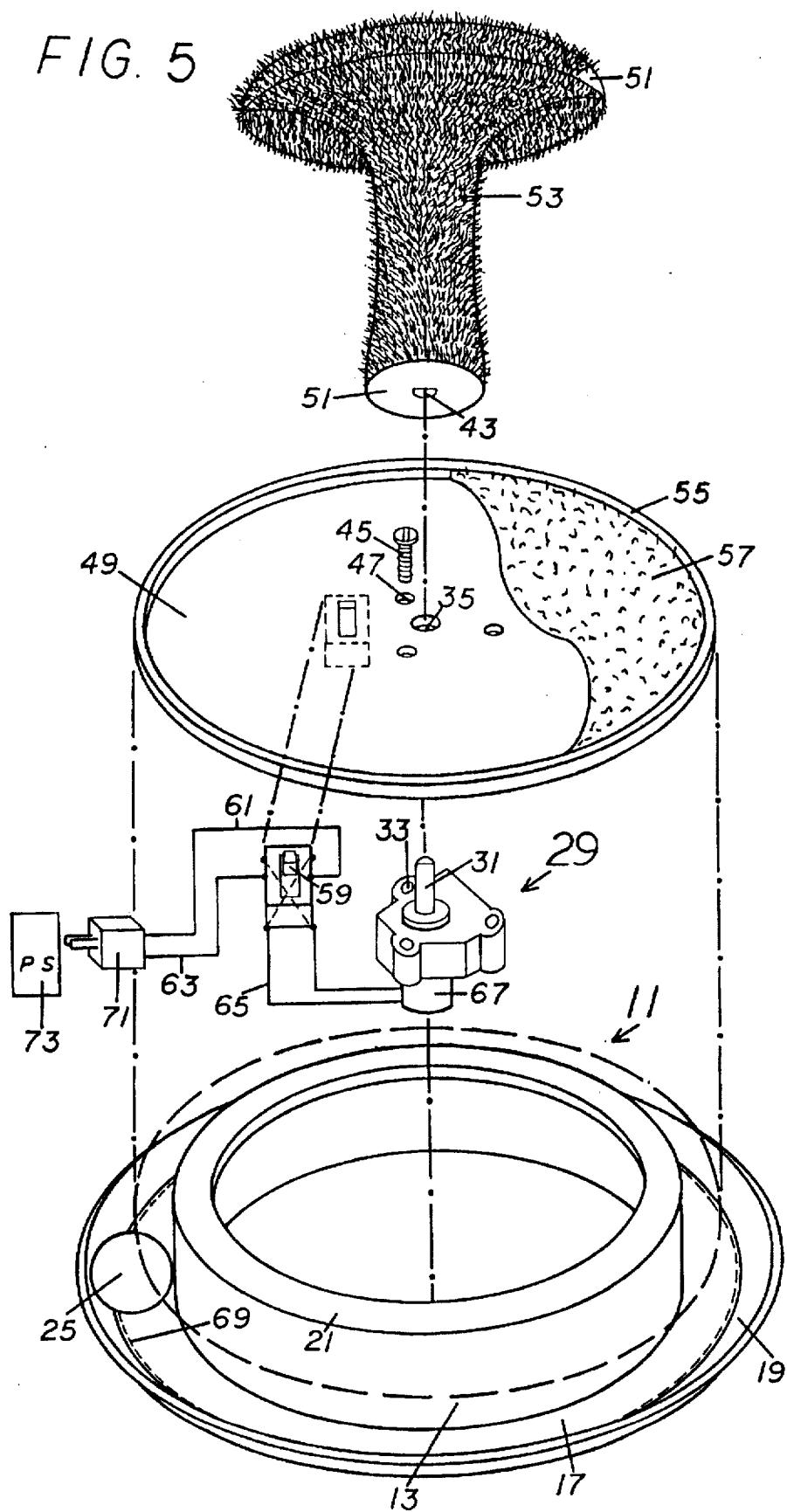

FIG. 5 is an exploded perspective view of an alternate embodiment of FIG. 1a of a combined mechanically assisted, exercise, amusement, self-grooming, and claw scratching device for animals comprising a circular housing 11 having a lower surface forming a base 17, a vertically oriented inside peripheral sidewall 13 extending from the lower surface, and an outwardly angled outside peripheral sidewall 19 also extending from the lower surface, thereby completing a continuous ring shaped track. Circular housing 11 further includes a movable object, such as a ball 25 employed between the inside 13 and outside 19 peripheral sidewalls, and rests upon the lower surface forming a base 17. The underside of base 17 is provided with a short ridge 69 shown in hidden lines, extending downwards to prevent housing 11 from sliding. The top vertical edge of inside peripheral sidewall 13 has an angled surface or ledge 21 extending briefly inwards towards the track center. Surface 21 provides a platform for affixing an upper circular planar surface 49 by heat sealing. Planar surface 49 extends substantially beyond the inside peripheral vertical sidewall surface 13, whereby the overhanging portion of planar surface 49 provides an upper partial concealment surface for a hide and seek scenario of ball 25. The overhang provides substantial side oriented viewing of ball 25, and will prevent the ball from being removed from the confines of the track by an animal, as the outer edge of planar surface 49 and upper edge of outside peripheral sidewall 19 present a slightly smaller opening than the outside diameter of ball 25, thereby trapping the ball. The hide and seek scenario presented by a lure or ball, promotes considerably longer and varied play action from an animal, than a totally exposed ball. A motor assembly 29 is disposed within housing 11 and is affixed to the underside of planar surface 49 by screw 45 passing through opening 47, and threadably secured to threaded openings 33 on motor assembly 29. Motor assembly flatted output shaft 31 passes through opening 35 and directly couples to flatted opening 43 of brush body 51 above planar surface 49. Planar surface 49 employs a raised ridge 55 throughout its perimeter edge and serves as a finish means for a claw scratching material surface edge. A double pole, double throw motor reversing switch with an off position 61 provides safe low voltage power to miniature motor 67 via wiring 65. Slidable switch button 59 furnishes power to rotate motor output shaft 31 clockwise, or counterclockwise from 120 volt power source 73, via low voltage converter/plug 71, and wiring 63 to switch 61. Cross-over reversing wiring under switch is not shown. The rubbing medium, or grooming brush body 51 is mushroom shaped, whereby it can groom the side and top surfaces of an animal's coat simultaneously. The protruding bristles 53 substantially cover the entire surface of the brush body 51 and are of sufficient stiffness to pull the loose hair and body debris from an animal's coat. Applicant has found that revolutions of the brush are satisfactory between 10 and 20 rpm. The miniature motor assembly is maintenance-free. This applicant's prototype device employs a motor rated at 24 volts DC at 26 rpm, but is operated with a 12 volt DC converter, thereby producing 13 rpm. This particular motor assembly produces substantial torque, and can be repeatedly stalled by a closed hand placed around the brush with no adverse affects to the motor or heavy duty gear-train. This miniature motor assembly has proved to be very reliable for over ten months of use and mis-use. Not one of this applicant's three cats have been able to stall the brush. The motor body is cool to the touch after a period of grooming has taken place and the 50 milliamp converter/plug is slightly warm to the touch.

CONCLUSION

Thus it has been shown that the combined mechanically assisted animal exercise, amusement, self-grooming, and claw scratching stimulator can perform all of the objectives as outlined above. Many other variations are possible. For example, it would be obvious to those already skilled in the art that may consider a ball shaped brush, or several brushes, or the use of sensors such as heat or motion to activate the device automatically, or electronic sound synthesizers. While the above descriptions may contain many specific details, these should not be construed as limitations on the scope of the invention, but rather as examples of embodiments or modifications, herein detailed in accordance with the descriptive requirements of law. It should be understood that the details are to be interpreted as illustrative and not in a limiting sense.

I claim:

1. A combined mechanically assisted animal exercise, amusement, self-grooming, and claw scratching device for animals comprising:
   a) a housing forming a base and having a vertically oriented peripheral sidewall and an upper surface supported by said peripheral sidewall;
   b) a shaft extending through said upper surface of said housing;
   c) means for rotating said shaft disposed within said housing, said rotating means causing said shaft to rotate at a preselected rate of revolution;
   d) rubbing means directly coupled to said shaft and disposed above said upper surface of said housing;
   e) a continuous track encircling said vertically oriented peripheral sidewall, said continuous track having an open side to provide access to the interior thereof;
   f) an object disposed within said continuous track and freely movable therein.

2. The device of claim 1, wherein said housing is circular in crosssection and said continuous track comprises an annular ring.

3. The device of claim 1, wherein said means for rotating said shaft comprises an electric motor.

4. The device of claim 1, wherein said rubbing means comprises a brush having a rigid body coupled to said shaft and a plurality of bristles extending outwardly from said rigid body.

5. The device of claim 4, wherein said brush having a rigid body is comprised of a mushroom-shape to enable side and top surface grooming simultaneously to an animal's coat.

6. The device of claim 1, further comprising a reversing switch connected to said means for rotating said shaft such that the direction of rotation of said shaft may be selectively reversed.

7. The device of claim 1, wherein said movable object is a freely moving ball.

8. The device of claim 1, wherein said upper surface of said housing includes means for permitting an animal to sink its claws therein and thus function as a scratching pad for an animal.

9. A combined mechanically assisted animal exercise, amusement, self-grooming, and claw scratching device for animals comprising:

a) a circular housing forming a base and having a vertically oriented peripheral sidewall supporting an upper circular planar surface, said upper surface of said housing including means for permitting an animal to sink its claws therein and thus function as a scratching pad for the animal;

b) a shaft extending through said upper surface of said housing and having an upper and a lower end;

c) a motor assembly disposed within said housing and directly coupled to said lower end of said shaft;

d) brushing means directly coupled inline to said upper end of said shaft; said brushing means being disposed above said upper surface of said housing;

e) a reversing switch connected to said motor assembly for selectively reversing the direction of rotation of said motor assembly;

f) a continuous annular track encircling said vertical oriented peripheral sidewall, said continuous track having an open side to provide access to the interior thereof;

g) an object disposed within said continuous track and freely movable therein.

10. The device of claim 9, wherein said brushing means is comprised of an upstanding mushroom-shaped configuration to allow simultaneous grooming of the side and top surfaces of an animal's coat.

11. The device of claim 9, wherein said movable object is a ball.

* * * * *